United States Patent [19]

Merola

[11] 4,216,521
[45] Aug. 5, 1980

[54] COMPOSITE GROUNDABLE BARRIER FOR SWITCHGEAR

[75] Inventor: Carl R. Merola, Monroeville, Pa.

[73] Assignee: Westinghouse Electric Corp., Pittsburgh, Pa.

[21] Appl. No.: 6,833

[22] Filed: Jan. 26, 1979

[51] Int. Cl.² .............................................. H02B 1/04
[52] U.S. Cl. .............................. 361/345; 200/50 AA; 361/337; 361/212
[58] Field of Search ................. 200/50 AA, 304, 305; 361/212, 331, 332, 334, 336–339, 343, 345; 174/5 R, 5 SG

[56] References Cited

U.S. PATENT DOCUMENTS

| | | | |
|---|---|---|---|
| 3,015,756 | 1/1962 | Kreekon | 361/337 |
| 3,920,939 | 11/1975 | Ciboldi | 200/50 AA |
| 4,154,430 | 5/1979 | Pfarr, Jr. | 361/212 |

Primary Examiner—Gerald P. Tolin
Attorney, Agent, or Firm—M. J. Moran

[57] ABSTRACT

A shutter for high voltage metal clad switchgear is taught which is a composite of electrically insulating material such as polyester and islands of electrically conductive material such as non-magnetic aluminum. The polyester material reduces the chance for flashover between the high voltage conductors and the grounded metal islands or other conductors, while the grounded metal islands provide a region of zero ground potential in an area associated with the opening in high voltage terminal assemblies to thus assure that personnel who approach this region will always be exposed to ground potential and not high voltage potential.

12 Claims, 14 Drawing Figures

COMPOSITE GROUNDABLE BARRIER FOR SWITCHGEAR

BACKGROUND OF THE INVENTION

The subject matter of this invention relates generally to protective shutters for the live stationary terminals of metal clad or metal enclosed switchgear and relates more specifically to composite insulating-conducting barriers which are capable of being grounded in appropriate circumstances.

Metal clad and metal enclosed switchgear are well known electrical apparatus. Generally, a metal enclosed switchgear apparatus includes a metal cabinet having high voltage stationary electrical terminals in the rear portion thereof to which may be connected the terminals of draw-out or roll-out circuit breaker apparatus. The circuit breaker apparatus is generally self-contained and portable to the extent that it can be completely removed from the cabinet for repair, replacement or the like. Prior to operation, the front of the cabinet is opened, the circuit breaker is rolled into position for engagement with the complementary high-voltage terminals and then the cabinet door is closed. At this point, an appropriate manual or motor driven "levering in" operation is begun. The latter "levering in" operation constitutes the final stage in the joining of the stationary high-voltage contacts of the stationary switchgear cabinet with the complementary contacts of the portable circuit breaker apparatus. This is done within the confines of an enclosed metal cabinet for safety. Furthermore, the cabinet is maintained at ground potential for providing a suitable envelope of protection around the high voltage apparatus and terminations contained therein. It had been found previously in the prior art that it was advantageous to somehow shield the high-voltage terminals of the switchgear cabinet from inadvertent physical contact with either persons or other objects when the portable circuit breaker apparatus had been removed. To accomplish this, interlocking means on the cabinet which are complementary with portions of the portable circuit breaker are constructed and aligned in such a way that as the circuit breaker apparatus is removed from the switchgear cabinet, a protective shutter device is automatically deployed in front of the high voltage terminals. Such apparatus is shown in prior art U.S. Pat. No. 3,213,222, issued Oct. 19, 1965 to J. D. Finley et al. and entitled, "Switchgear Shutter". The latter patent is assigned to the assignee of the present invention. In the aforementioned prior art patent, the shutter essentially comprises sheet metal material. The sheet metal material when in place in front of the aforementioned high-voltage terminals essentially provides a complete zero ground plane between the circuit breaker portion of the switchgear cabinet and the stationary terminals of the high voltage portion. It is easy to see that this provides significant protection for personnel who may find themselves within the circuit breaker portion of the cabinet. It can also be seen by examining the aforementioned prior art patent that the main stationary terminals are offset from the shutter by an insulating spout or bottle which comprises a hollow cylindrical insulator into which elongated complementary terminals of the circuit breaker protrude for eventual interconnection with the stationary terminals at the rear of the spout or bottle. The combination of the lowered shutter in front of the opening in the spout and the elongated insulating tubular barrel provide significant electrical protection. As the prior art developed and the relative size of circuit breaker apparatus and switchgear cabinets were reduced for more efficient utilization of material and space, the longitudinal distance between the shutter at one end of the spout or bottle and the high voltage contacts at the other end began to diminish to a point where flashover between the contact and the shutter was possible or where flashover between a stored shutter and a line circuit breaker contact was possible. To offset this, the shutters of the more advanced state of the prior art were made of insulating material such as a polyester material which was not electrically conducting and which essentially solved the problem of flashover. However, at this point in the advanced state of the prior art, a significant problem arose. Namely, the polyester material is suitable for insulating the front of the spouts or bottles, i.e., the circuit breaker portion of the switchgear cabinet, from the high voltage terminals at the ends of the bottles, however, the capacitive effect associated with the polyester material acts in such a way that an electrostatic charge can build up or accumulate on a portion of the insulating material so that inadvertent contact therewith from the circuit breaker portion of the switchgear cabinet can be dangerous. On the other hand, the metal shutters are grounded and provided a zero ground plane as was described previously, but are susceptible to arc-over or flashing as was described previously. It would be advantageous, therefore, if a shutter could be found which solved the problem of flashover and solve the problem of electrostatic charge build-up.

SUMMARY OF THE INVENTION

In accordance with the invention, a composite electrically conducting and electrically insulating shutter is provided for placement over the ends of the bottles or spouts of the high voltage stationary terminals of metal clad switchgear to effectively separate the high voltage compartment of the switchgear from the circuit breaker compartment of the switchgear when the circuit breaker apparatus has been removed. The shutter comprises a significant amount of insulating material which prevents flashover and judiciously disposed electrically-conducting material which provides suitable electrical ground planes at critical portions of the shutter. Furthermore, the electrically-conducting material is grounded only when the shutter is in its protective disposition. The ground interconnection is removed as the shutter is disposed away from the openings in the spouts for storage when the circuit breaker terminals are in a position of contact with the high-voltage terminals. The ungrounding of the electrically-conducting material allows for a relatively short distance of shutter travel from its protected position to its stored or nonprotective position.

BRIEF DESCRIPTION OF THE DRAWINGS

For a better understanding of the invention, reference may be had to the preferred embodiments thereof shown in the accompanying drawings in which.

DESCRIPTION OF THE PREFERRED EMBODIMENTS

Figure 1:
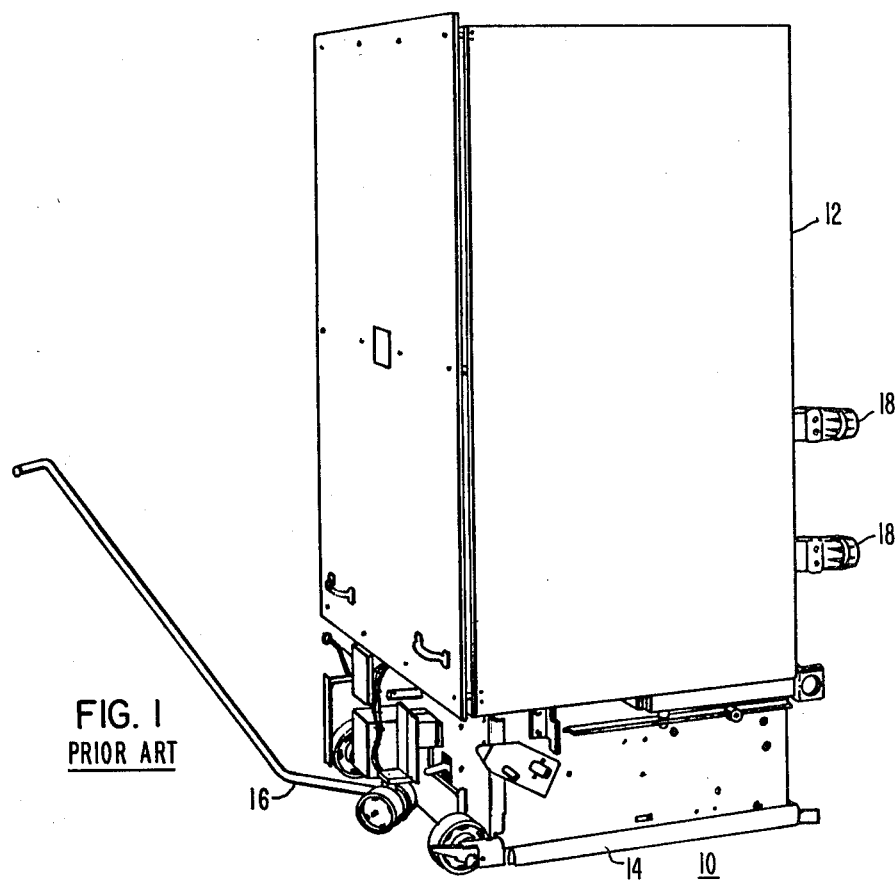
FIG. 1 shows a three-dimensional view of a prior art circuit breaker for use with metal clad switchgear of a type which has a shutter therein.

Referring now to the drawings and FIGS. 1 through 6 in particular, prior art circuit breaker apparatus of the kind related to the present invention is shown. In particular in FIG. 1, a prior art draw-out circuit breaker 10 is shown. The draw-out circuit breaker 10 includes a circuit breaker section 12 and a trolley section 14. The circuit breaker section 12 includes circuit breaker apparatus for example, and the trolley portion 14 includes mechanisms, latches, and other apparatus associated with the circuit breaker. There is also provided a handle 16 which is detachably attached to the portable circuit breaker trolley 14 in such a manner that the circuit breaker 10 may be wheeled into and out of a metal clad or a metal enclosed switchgear cabinet. There are shown circuit breaker contacts 18 which are complementary with stationary high voltage contacts (not shown in FIG. 1) in the circuit breaker cabinet.

Figure 2:
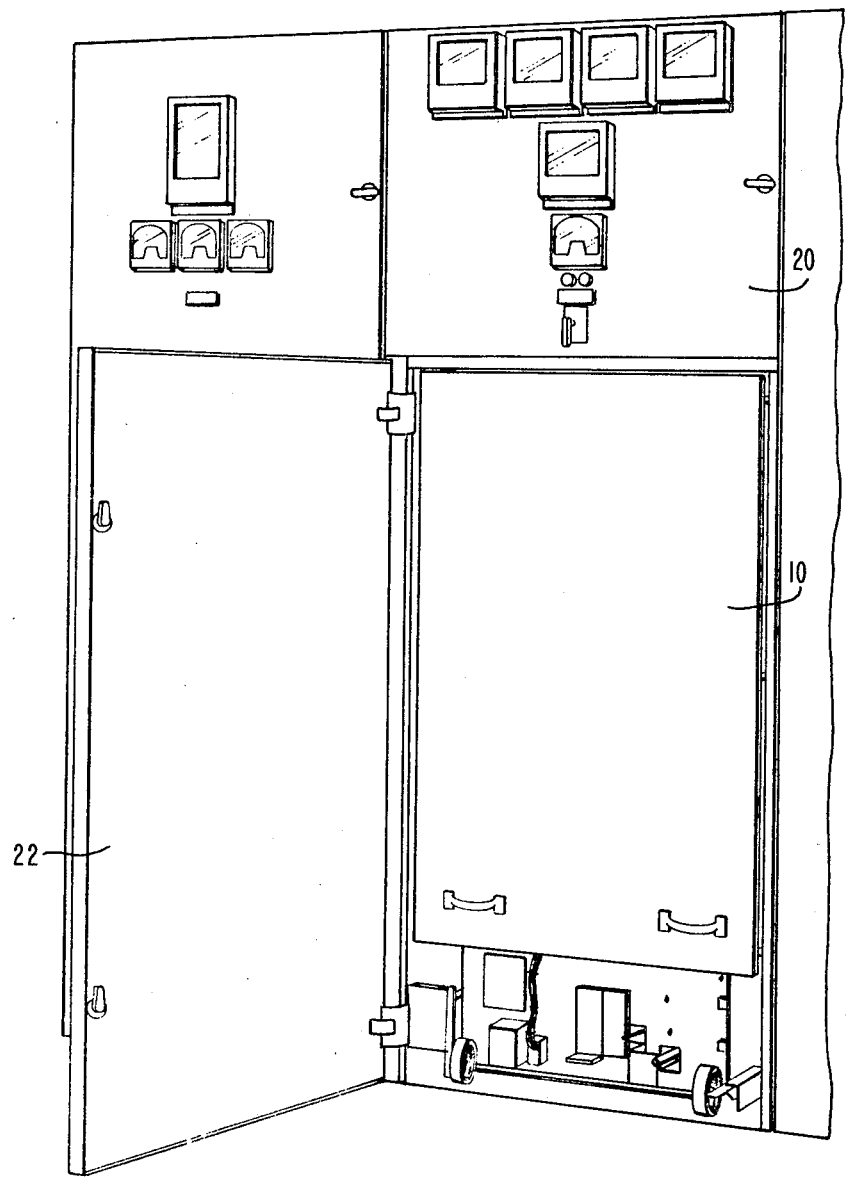
FIG. 2 shows the circuit breaker of FIG. 1 disposed within metal clad switchgear in an operating position.

Referring now to FIG. 2, the portable circuit breaker apparatus 10 of FIG. 1 is shown disposed or positioned in a metal clad circuit breaker cabinet 20. It is to be noted that the removable handle 16 has been taken away. A door 22 on the circuit breaker cabinet 20 may be closed at this point providing a complete metal enclosure around the circuit breaker apparatus 10.

Figure 3:
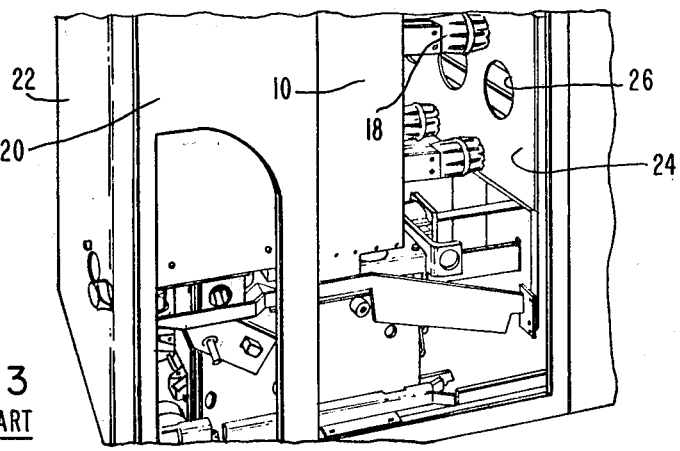
FIG. 3 shows the apparatus of FIGS. 1 and 2 in a position immediately prior to the beginning of the levering in operation.
Figure 4:
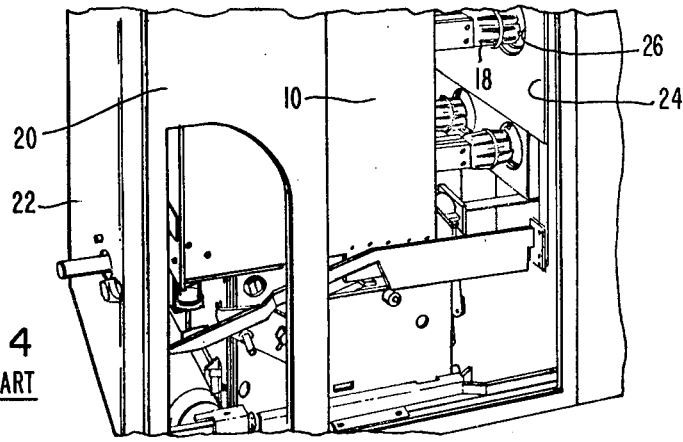
FIG. 4 shows the circuit breaker apparatus of FIG. 3, in an intermediate levering in disposition.
Figure 5:
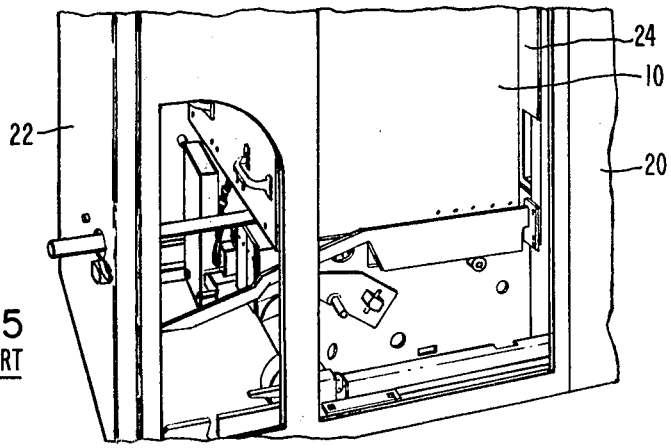
FIG. 5 shows the circuit breaker apparatus of FIGS. 3 and 4, in a completely levered in disposition.

Referring now to FIGS. 3 through 5, the stages of "levering in" of the circuit breaker apparatus 10 of FIGS. 1 and 2 are shown. In FIG. 3, the circuit breaker apparatus 10 is shown disposed in the cabinet 20 in generally the same disposition as shown in FIG. 2, but with the door 22 closed. The contacts 18 are shown in proximity to a glass polyester insulating shutter 24 having openings 26 therein through which the elongated contacts 18 may protrude for eventual interconnection with the high voltage terminals. In some parts of the prior art the shutter 24 may comprise metal or conductive material. It is to be noted in this case that the holes 26 are not aligned with the contacts 18. In FIG. 4, the levering in operation has begun and is in an intermediate state. In this case, appropriate linkages and latches on the portable circuit breaker 10 have been interlinked with complementary members on the cabinet 20 for moving the shutter 24 to a non-protective disposition so that the contacts 18 may protrude through the now-aligned openings 26 for eventual making with the high voltage contacts (not shown) of the cabinet 20. In FIG. 5, the levering in operation has been completed and the circuit breaker apparatus 10 is in its operating disposition within the cabinet 20.

Figure 6:
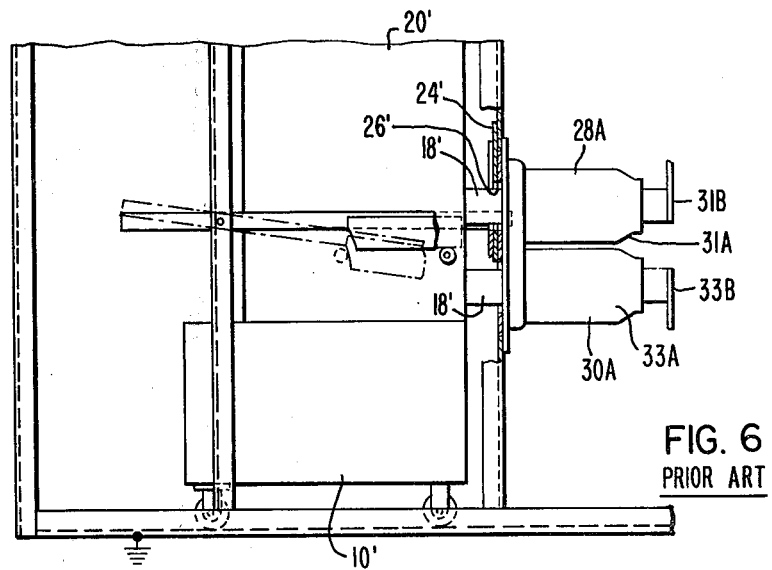
FIG. 6 shows a side view partially broken away and partially in section of circuit breaker apparatus similar to but not necessarily the same as that shown in FIGS. 1 through 5 in which a protective shutter is shown.

Referring now to FIG. 6, a side elevation of circuit breaker apparatus similar to but not necessarily exactly the same as that shown in FIGS. 1 and 5 is depicted. In this case, terminals 18' are shown protruding through openings 26' in a raised shutter 24' into a high voltage terminal assembly 28A on the top and 30A on the bottom. The high voltage terminal assembly 28A includes an elongated cylindrical hollow bottle or spout 31A at the rear of which is disposed a high voltage terminal 31B. In a like manner, the high voltage terminal assembly 30A includes an elonated electrically-insulating spout 33A at the rear of which is the high voltage terminal 33B. The circuit breaker apparatus 10' is shown completely levered into the cabinet 20' in the depiction of FIG. 6.

Figure 7:
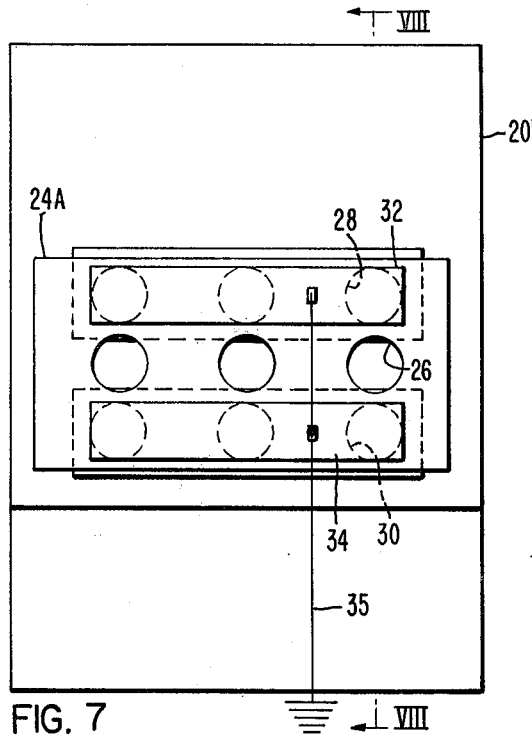
FIG. 7 shows a front view of a portion of the rear of the circuit breaker compartment of switchgear apparatus such as shown in the prior art in FIGS. 1 through 6 in which a novel composite shutter arrangement is shown in its lowered or protective disposition.
Figure 8:
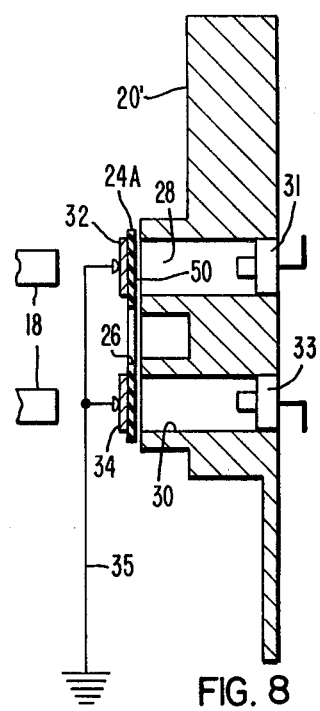
FIG. 8 shows a side view partially cut away and partially in section of the apparatus of FIG. 7.

Referring now to FIGS. 7 and 8, an embodiment of the invention is shown. In particular, A compartmentizing wall 20' which exists between the high voltage section and the circuit breaker section of a switch gear cabinet is shown. In this case, sets of three-phase terminal assemblies 28 and 30 are shown on the top and on the bottom of the wall 20' respectively. The circuit breaker is interconnected between the terminal assemblies 28 and 30 for each of the phases. There is provided a composite polyester and metal shutter 24A having a first rectangular electrically conducting metal bar 32 disposed to completely shadow or shield the openings for the top conductors assemblies 28. In a like manner, a similar rectangular bar 34 is provided to completely shield the terminals for the bottom assemblies 30. The composite shield 24A shown in FIGS. 7 and 8 is shown in a protective disposition where the electrically conductive plates 32 and 34 cooperate with a grounding member 35 to place ground potential at the fronts of the bottles or spouts associated with the terminal apparatus 28 and 30. Furthermore, the polyester or insulating portion 50 upon which the conductive members 32 and 34 are disposed prevent or reduce the opportunity for flashover between electrical terminals 31 and 33 at the right end of the terminal assemblies 28 and 30, respectively and elements to the left of shield 24A as shown in FIG. 8. Flashover, if occurring, would be between the terminal 31 and the grounded plate 32 in one instance and the terminal 33 and the grounded plate 34 in another instance.

Figure 9:
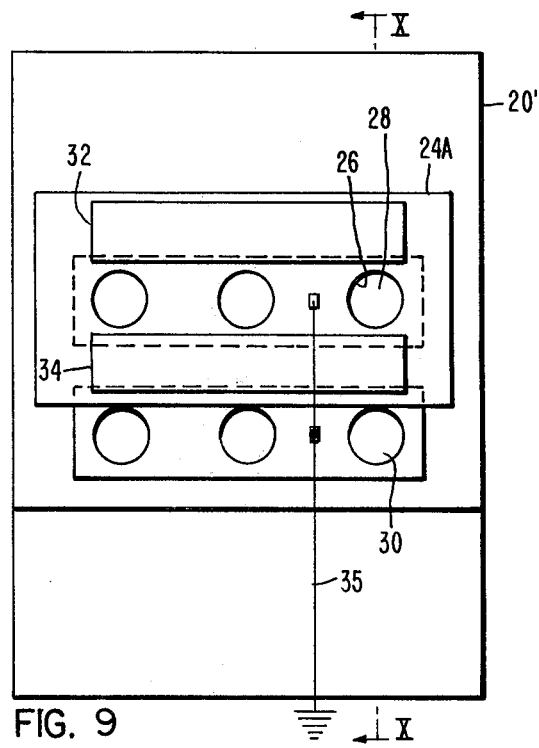
FIG. 9 shows the apparatus of FIG. 7 in a non-protective disposition.
Figure 10:
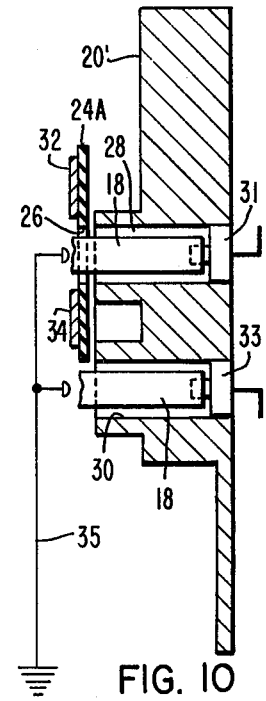
FIG. 10 shows a side view of the apparatus of FIG. 9.

Referring now to FIGS. 9 and 10, the embodiment of FIGS. 7 and 8 is shown in which the composite shield 24A has been raised to its storage disposition. In this case, openings for the terminal assemblies 28 and 30 are exposed for entry of elongated terminals 18 of the circuit breaker apparatus. Furthermore, the conductive plates 32 and 34 are now in a disposition of non-electrical contact with the grounding rod or means 35. Consequently, electrical interconnection can be made between the terminals 18 of the circuit breaker and the high voltage terminals 31 and 33, respectively. Note that the upper terminals 18 protrudes through holes 26 in the shield 24A while the lower terminals 18 clear the bottom of the now-raised shield 24A. In both cases, the conductive members 32 and 34, although disposed relatively close to the terminals 18 are less likely to interact electrically therewith because of the fact that they are able to electrically float at a potential associated with the conductors 18. If the conductive plates 32 and 34 remained grounded when in the disposition shown in FIG. 10, for example, flashover between terminals 18 and the conductive plates 32 and/or 34 would be more likely.

Figure 11:
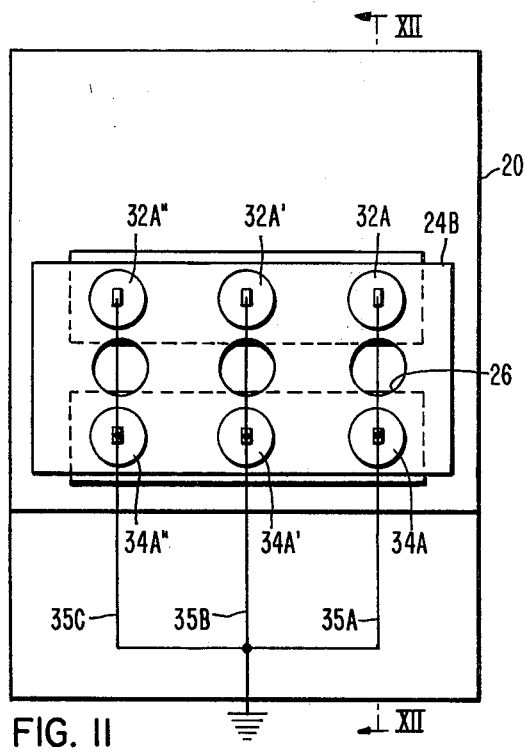
FIG. 11 shows another embodiment of the invention in a disposition similar to that shown in FIGS. 7 through 10.
Figure 12:
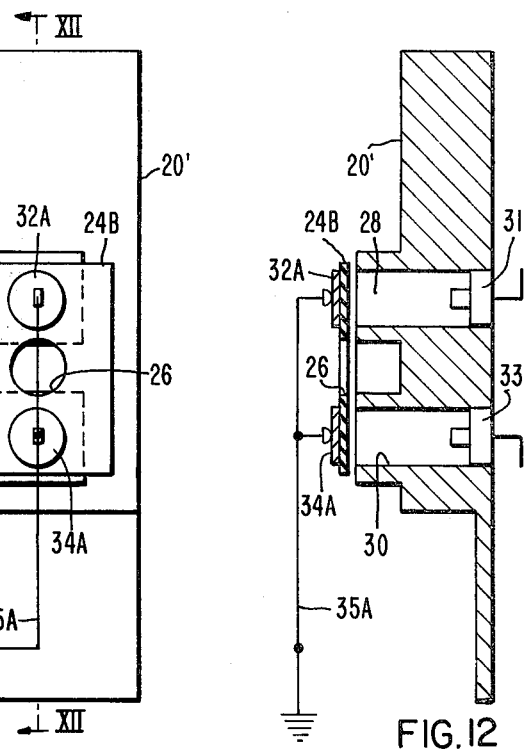
FIG. 12 shows a side view partially broken away and partially in section of the embodiment of FIG. 11.

Referring now to FIGS. 11 and 12, still another embodiment of the invention is shown in which a composite shield 24B is disposed proximate to the partition 20'. The composite shield 24B operates mechanically essentially the same as shield 24A shown with respect to FIGS. 7 through 10. Furthermore, the grounding operation is similar except that three grounding rods 35A, 35B and 35C are required in this case because of the multiplicity of isolated grounded conductor plates. The shield 24B which comprises insulating polyester material has on the upper portion thereof three circular conducting plates or members 32A, 32A' and 32A" for each of the three upper terminal assemblies 28. In a like manner, there is disposed on the bottom portion of the polyester or insulating shield 24B three lower conducting plates or members 34A, 34A' and 34A" for each of the terminal assemblies 30. Each of the conductive circular plates 32A, 32A' and 32A" as well as 34A, 34A' and 34A" may be connected to ground in appropriate circumstances by way of grounding devices 35A, 35B and 35C. It will be noted that the total amount of conductive plate material necessary in this embodiment of the invention may be less than shown in the embodiment of FIGS. 7 through 10, for example. Nevertheless, the apparatus associated with FIGS. 11 and 12 provides significant protection of the kind described previously with respect to other embodiments.

Figure 13:
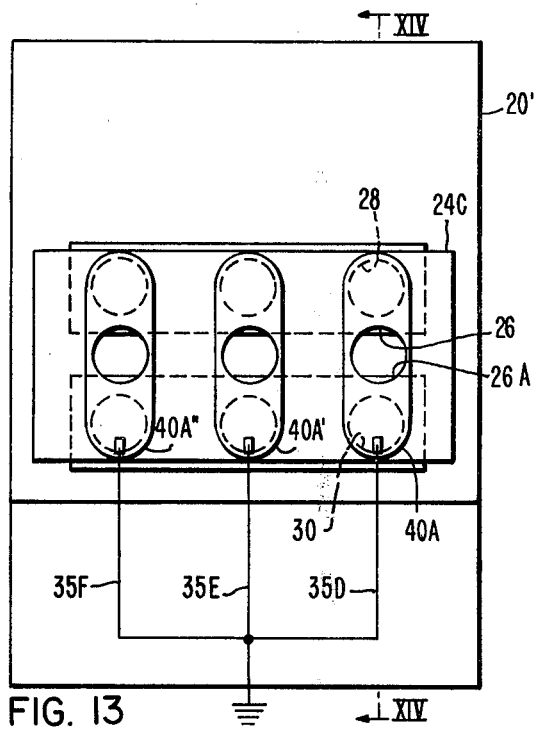
FIG. 13 shows still another embodiment of the invention similar to those shown in FIGS. 7 and 11.
Figure 14:
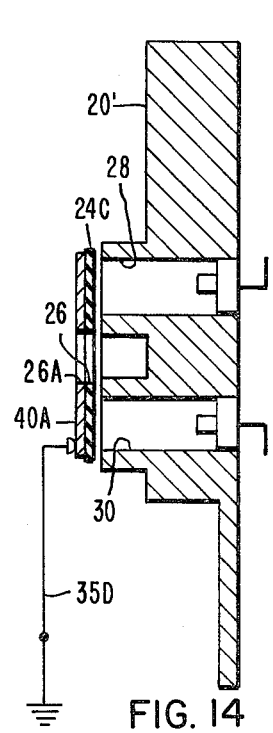
FIG. 14 shows a side view partially broken away and partially in section of the apparatus of FIG. 13.

Referring now to FIGS. 13 and 14, still another embodiment of the invention is shown in which an insulating shield 24C has disposed thereon three vertically-aligned electrically conducting plates 40A, 40A' and 40A" for each set of terminal assemblies 28 and 30. It will be noted that each of the conductive plates 40A, 40A' and 40A" overlap two terminal assemblies 28 and 30 vertically in the same manner that the conductive plates 32 and 34 of FIGS. 7 through 10 overlap three terminal assemblies 28 horizontally. It will be noted that in each of the conductive assemblies 40A, 40A' and 40A", there is disposed a hole or opening 26A which aligns with a similar hole or opening 26 in the insulating material of the shield 24C. When the shield 24C is in the raised or non-shielding position, the two aligned holes 26A and 26 become aligned with the uppermost terminal assembly 28 for insertion therethrough of an elongated circuit breaker contact 18 (not shown) for interconnection with an appropriate high voltage cabinet terminal assembly. Ground rods or means 35D, 35E and 35F interconnect with conductive plates 40A, 40A' and 40A" respectively when the shield is in the protective disposition shown in FIGS. 13 and 14.

If desired, the various embodiments of the invention 24A, 24B and 24C may include non-magnetic conductive material for further enhancing the electrical characteristics of the shutter.

It is to be understood with respect to the embodiments of the invention that the apparatus taught is not limited to three phase operation or AC operation. It is further to be understood that grounding apparatus such as 35 and 35A through 35F are illustrative and non-limiting. It is also to be understood that the particular construction of the high voltage switchgear cabinet terminal such as shown at 31 and 33, for example, is not limiting but merely illustrative. Furthermore, the particular construction of the circuit breaker terminal shown at 18 is not limiting but but merely illustrative. Furthermore, it is to be understood that the teachings of this invention may be utilized with respect to switchgear apparatus or other apparatus in which it is desirable to provide shielding which is resistive to electrical flashover and which may be maintained at ground potential in at least one position between complementary terminals. It is also to be understood that the teachings of this invention are not limited to high voltage applications. It is also to be understood that the concept of raising a shield from a protective disposition to a non-protective disposition is not limiting. The shield may be lower or moved sideways in other embodiments.

The apparatus taught with respect to the embodiments of the invention have many advantages. One advantage lies in the fact that appropriate shielding may be implemented between the circuit breaker compartment and the high voltage compartment of metal clad or metal encased switchgear which accomplishes two desirable purposes, the first of which is to limit flashover between the high voltage terminal at one end of the spout or bottle in the high voltage compartment and the shield itself at the other end of the bottle, and the other purpose of which is to provide a ground potential at the aforementioned other end of the bottle for preventing the build-up of dangerous electrostatic charge of very high voltage at an exposed surface of the polyester or insulating shield which communicates with the circuit breaker compartment of the switchgear. Another advantage lies in the fact that the electrically conductive material is disposed in a non-grounded or floating potential state when the shutter is disposed in its non-protective disposition so that energized high voltage conductors may be proximate thereto without causing high voltage flashover or other similar undesirable electrical phenomena to occur. Another advantage lies in the fact that the utilization of non-magnetic material such as aluminum as the conductive material adds a highly desirable non-magnetic characteristic to the shield. Another advantage lies in the fact that the electrically-conductive portion of the shield may be of reduced area relative to an entire surface area of the shield for thus reducing cost, weight and size. Another advantage lies in the fact that even if the entire front portion of a shield is covered with electrically-conductive material, except for appropriate openings therein through which the moving contacts of the circuit breaker are inserted, significant isolation of the plate from the high voltage terminals at the other end of the spout or tube is achieved.

What I claim as my invention is:
1. Electrical apparatus, comprising:
   (a) support means;
   (b) a stationary electrical contact disposed on said support means in a disposition to be contacted only from a point within a limited three-dimensional angular range;

(c) movable electrical contact means for being selectively disposed in a disposition of engagement with said stationary contact means or not, said engagement coming from a point within said range;

(d) movable composite barrier means movably disposed upon said support means for being actuated to a first position to insulate said stationary contact from any point within said range when said movable contact means is not in a disposition of engagement with said contact, and for being actuated to a second position to allow said engagement of said stationary contact with said movable contact means, said composite barrier means comprising electrically insulating material for that portion thereof which is closest to said stationary contact when said barrier means is in said first position and electrically conducting material which is spaced from said stationary contact by said insulating material, said electrically conducting material being grounded when said barrier means is in said first position to thus interpose the electrical potential of ground between said stationary contact and any point in said range, said electrically conducting material being ungrounded when said barrier means is in said second position to thus reduce the tendency to interact electrically with said engaged stationary contact and said movable contact means;

(e) actuating means for moving said barrier means; and (f) grounding means for grounding said conducting material when said barrier means is in said first position.

2. Switchgear apparatus, comprising:
(a) a grounded metal enclosure;
(b) a stationary electrical contact disposed within said enclosure for being contacted within said enclosure from a point within a limited three-dimensional angular range;
(c) movable electrical apparatus including contact means for being selectively disposed in a disposition of engagement with said stationary contact or not, said engagement coming from a point within said range; and
(d) movable composite barrier means movably disposed within said enclosure means for being actuated to a first position to insulate said stationary contact from any point within said range when said contact means of said movable electrical apparatus is not in a disposition of engagement with said stationary contact, and for being actuated to a second position to allow said engagement of said stationary contact with said contact means of said movable electrical apparatus, said composite means comprising electrically insulating material for that portion thereof which is closest to said stationary contact when said barrier means is in said first position and electrically cnducting material which is spaced from said stationary contact by said insulating material, said electrically conducting material being grounded when said barrier means is in said first position to thus interpose the electrical potential of ground between said stationary contact and any point in said range, said electrically conducting material being ungrounded when said barrier means is in said second position to thus reduce the tendency to interact electrically with said engaged stationary contact and said electrical apparatus;

(e) actuating means for moving said barrier means; and (f) grounding means for grounding said conducting material when said barrier means is in said first position.

3. The combination as claimed in claim 2 wherein said electrical apparatus comprises a circuit breaker.

4. The combination as claimed in claim 2 wherein said barrier means comprises a shutter which moves in a generally vertical direction between said first and said second positions.

5. Switchgear apparatus, comprising:
(a) a grounded mmetal enclosure;
(b) a plurality of horizontally aligned stationary electrical contacts disposed within said enclosure, each of which is capable of being contacted within said enclosure from points within a limited three-dimensional angular range associated with each;
(c) movable electrical apparatus including a plurality of contacts means, each of which is capable of being selectively disposed in a disposition of engagement with said stationary contact or not, said engagement coming from points within said range; and
(d) movable composite barrier means movably disposed within said enclosure means for being actuated to a first position to insulate said stationary contacts from any point within said range when said contact means of said movable electrical apparatus are not in a disposition of engagement with said stationary contacts, and for being actuated to a second position to allow said engagement of said stationary contacts with said contact means of said movable electrical apparatus, said composite means comprising electrically insulating material for that portion thereof which is closest to said stationary contacts when said barrier means is in said first position and electrically conducting material which is spaced from said stationary contact by said insulating material, said electrically conducting material being grounded when said barrier means is in said first position to thus interpose the electrical potential of ground between said stationary contacts and any point in said range, said electrically conducting material being ungrounded when said barrier means is in said second position to thus reduce the tendency to interact electrically with said engaged stationary contacts and said electrical apparatus;

(e) actuating means for moving said barrier means; and (f) grounding means for grounding said conducting material when said barrier means is in said first position.

6. The combination as claimed in claim 5 wherein said electrical apparatus comprises a circuit breaker.

7. The combination as claimed in claim 5 wherein said barrier means comprises a shutter which moves in a generally vertical direction between a first shutter position and a second shutter position.

8. The combination as claimed in claim 7 wherein said electrically conducting material comprises a rectangular late which completely overlaps all of said horizontally aligned stationary electrical contacts when said barrier means is in said first position.

9. The combination as claimed in claim 8 wherein said conducting material is non-magnetic.

10. The combination as claimed in claim 7 wherein said electrically conducting material comprises separate plates, each of which completely overlaps one of such horizontally aligned stationary electrical contacts when said barrier means is in said first position.

11. The combination as claimed in claim 10 wherein said conducting material is non-magnetic.

12. The combination as claimed in claim 7 wherein a second plurality of horizontally aligned stationary contacts is disposed beneath the first plurality of horizontally aligned stationary contacts, said stationary electrically conducting material comprising separate plates, each of which completely overlaps one of said horizontally aligned stationary electrical contacts and one of said second plurality of horizontally aligned stationary contacts.

* * * * *